（12）United States Patent
Tsutsumi

(10) Patent No.: US 8,213,096 B2
(45) Date of Patent: Jul. 3, 2012

(54) IMAGING LENS AND IMAGING APPARATUS

(75) Inventor: Katsuhisa Tsutsumi, Saitama (JP)

(73) Assignee: Fujifilm Corporation, Tokyo (JP)

( * ) Notice: Subject to any disclaimer, the term of this patent is extended or adjusted under 35 U.S.C. 154(b) by 75 days.

(21) Appl. No.: 12/965,305

(22) Filed: Dec. 10, 2010

(65) Prior Publication Data

US 2011/0304929 A1    Dec. 15, 2011

(30) Foreign Application Priority Data

Dec. 16, 2009   (JP) ................. 2009-285044

(51) Int. Cl.
*G02B 9/12*   (2006.01)
*G02B 13/04*  (2006.01)
*H04N 5/225*  (2006.01)

(52) U.S. Cl. .................. 359/784; 359/749; 348/340

(58) Field of Classification Search .............. 348/340; 359/749–753, 784–792
See application file for complete search history.

(56) References Cited

U.S. PATENT DOCUMENTS

| | | | | |
|---|---|---|---|---|
| 4,871,243 A * | 10/1989 | Ogawa et al. | ............ | 359/754 |
| 5,331,465 A * | 7/1994 | Miyano | ............ | 359/693 |
| 5,640,277 A | 6/1997 | Ohshita | | |
| 6,549,344 B2 * | 4/2003 | Tsutsumi | ............ | 359/752 |
| 7,466,490 B2 | 12/2008 | Igarashi | | |

* cited by examiner

*Primary Examiner* — David N Spector
(74) *Attorney, Agent, or Firm* — Young & Thompson

(57) ABSTRACT

An imaging lens includes a first group having a positive or negative refractive power, a second group having a positive refractive power, a third group having a positive or negative refractive power, which are sequentially arranged from the object side of the imaging lens. The first group includes an aperture stop, and the second group includes a positive lens, and a cemented lens of a positive lens and a negative lens. The third group is composed of a cemented lens of a positive lens and a negative lens, and the following formula (1) is satisfied:

$$0.5 \leq f2/f \leq 1.2 \qquad (1), \text{where}$$

f: focal length of the entire system of the imaging lens, and
f2: focal length of the second group.

6 Claims, 16 Drawing Sheets

EXAMPLE 1

EXAMPLE 5

EXAMPLE 1 · INFINITY

FNO.=2.00
SPHERICAL ABERRATION

ω=8.9°
ASTIGMATISM

ω=8.9°
DISTORTION

EXAMPLE 1 · CLOSEST DISTANCE 0.75 m

FNO.=2.00
SPHERICAL ABERRATION

ω=8.7°
ASTIGMATISM

ω=8.7°
DISTORTION

EXAMPLE 2 · INFINITY

SPHERICAL ABERRATION

ASTIGMATISM

DISTORTION

EXAMPLE 2 · CLOSEST DISTANCE 0.75 m

SPHERICAL ABERRATION

ASTIGMATISM

DISTORTION

EXAMPLE 3 · INFINITY

SPHERICAL ABERRATION

ASTIGMATISM

DISTORTION

EXAMPLE 3 · CLOSEST DISTANCE 0.75 m

SPHERICAL ABERRATION

ASTIGMATISM

DISTORTION

EXAMPLE 4 · INFINITY
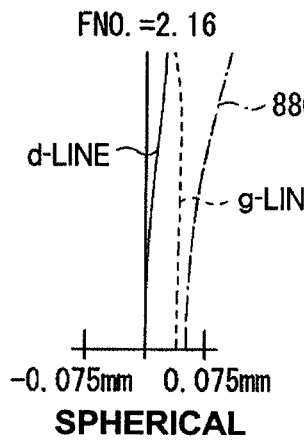
FIG.14A SPHERICAL ABERRATION
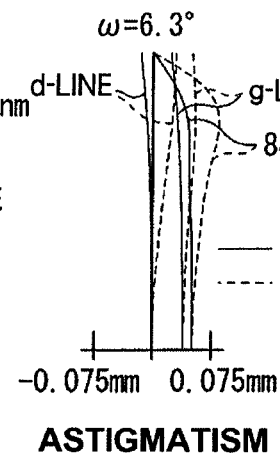
FIG.14B ASTIGMATISM
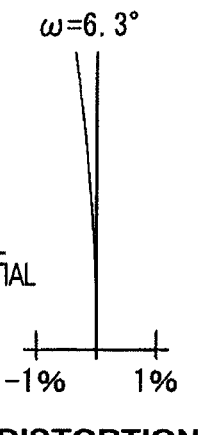
FIG.14C DISTORTION
EXAMPLE 4 · CLOSEST DISTANCE 1.0 m
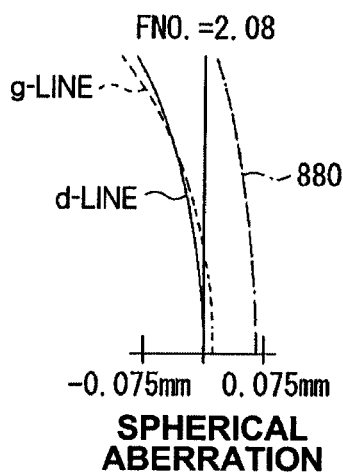
FIG.15A SPHERICAL ABERRATION
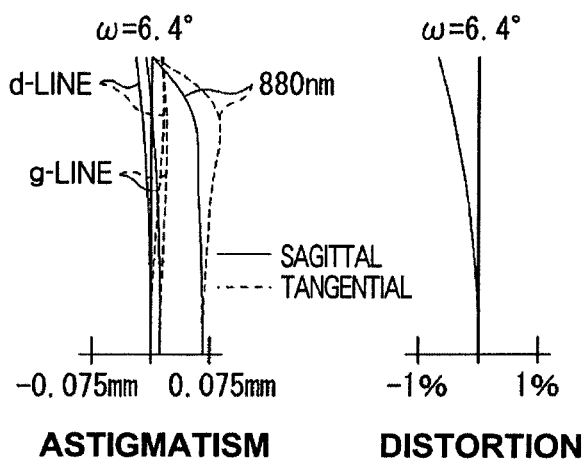
FIG.15B ASTIGMATISM
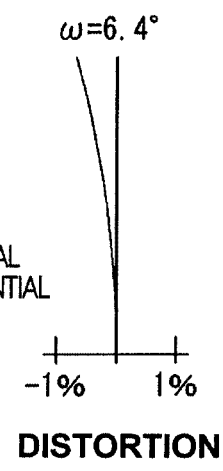
FIG.15C DISTORTION

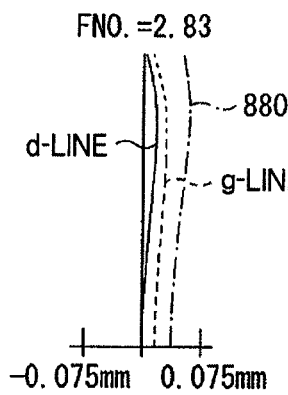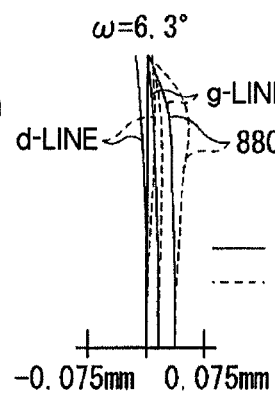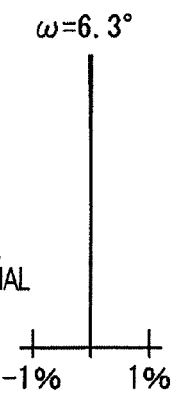
FIG.18A  FIG.18B  FIG.18C
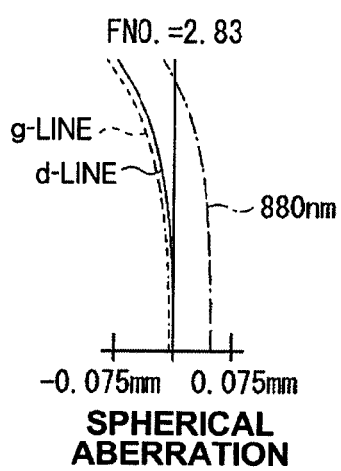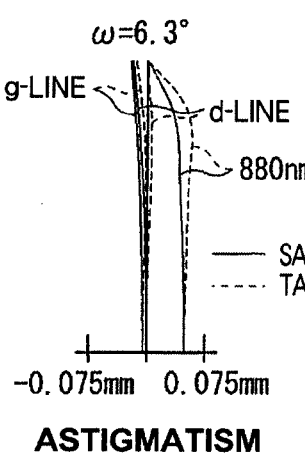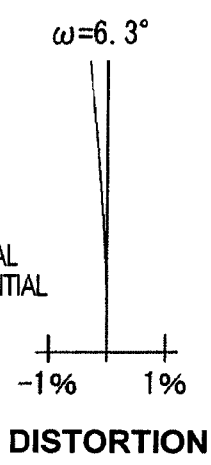
FIG.19A  FIG.19B  FIG.19C

EXAMPLE 7 · INFINITY

SPHERICAL ABERRATION

ASTIGMATISM

DISTORTION

EXAMPLE 7 · CLOSEST DISTANCE 1.0 m

SPHERICAL ABERRATION

ASTIGMATISM

DISTORTION

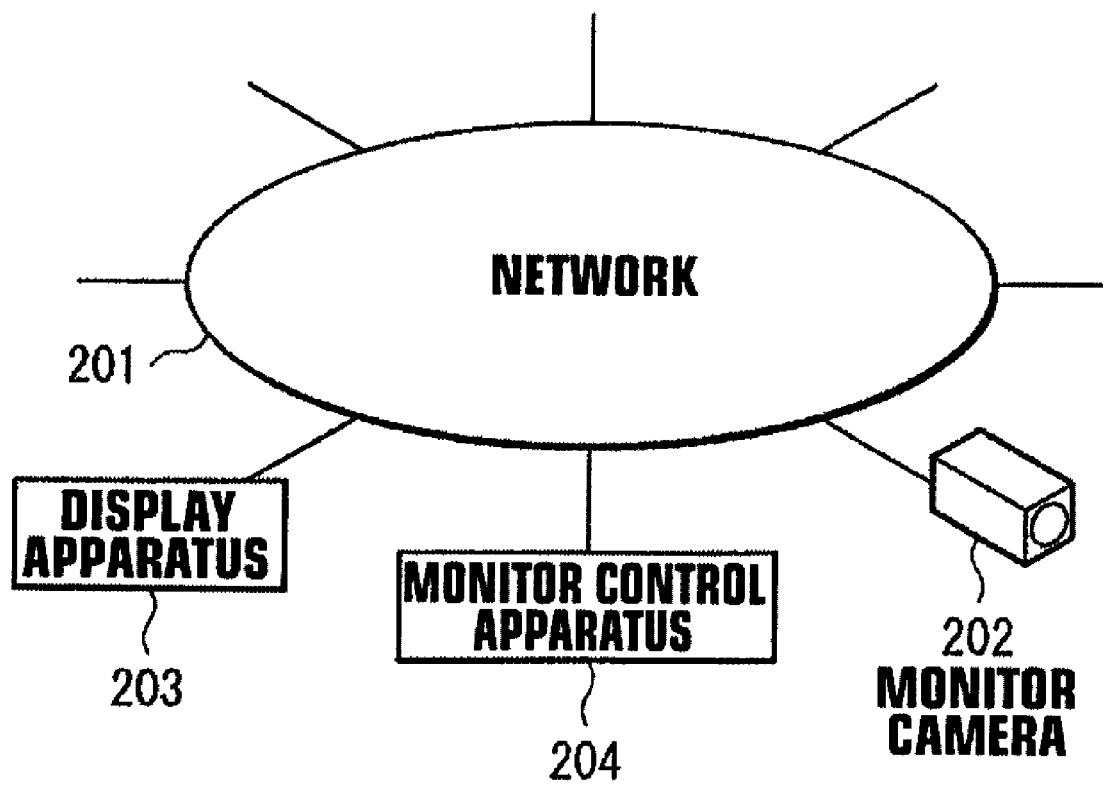

IMAGING LENS AND IMAGING APPARATUS

BACKGROUND OF THE INVENTION

1. Field of the Invention

The present invention relates to an imaging lens, the longitudinal chromatic aberration of which has been corrected especially from a visible light range to a near-infrared range, and which is appropriate for use in monitoring both day and night, and the like. Further, the present invention relates to an imaging apparatus on which the imaging lens has been mounted.

2. Description of the Related Art

Conventionally, a Gauss lens, which is a symmetric optical system, and a modified Gauss lens were used as fixed focus lenses of medium telephoto class. For example, U.S. Pat. No. 5,640,277 (Patent Document 1) discloses an invention related to a medium telephoto photography lens using a front group part of a Gauss lens, as the first lens group of the photography lens. The photography lens disclosed in Patent Document 1 adopts an inner-focus-type focusing method, in which an inner lens group is a movable group. Besides the photography lens disclosed in Patent Document 1, U.S. Pat. No. 7,466,490 (Patent Documents 2) discloses a fixed focus lens adopting an inner-focus-type focusing method in an objective optical system for an endoscope.

Since lenses for monitoring and the like are often used both day and night (the same lens is used for day and night), it is necessary that longitudinal chromatic aberration is corrected from the visible light range to the near-infrared range. Further, as network cameras became widely used, and the resolution of sensors (imaging devices) became higher in recent years, a demand for imaging lenses that can cope with a large pixel number of 5 megapixels or the like is increasing also for monitoring use. Therefore, it is necessary to suppress longitudinal chromatic aberration for a wide wavelength range in an excellent manner. Meanwhile, as described above, an optical system that is called as the Gauss lens, and which is a symmetric optical system, was often used as a fixed focus lens of medium telephoto class from the past. However, it was difficult to correct longitudinal chromatic aberration for a wide wavelength range by using the Gauss lens. Further, in the Gauss lens, variation of aberrations depending on photography distances was relatively large.

SUMMARY OF THE INVENTION

In view of the foregoing circumstances, it is an object of the present invention to provide an imaging lens of medium telephoto class that can achieve high resolution performance in which longitudinal chromatic aberrations and the like are suppressed for a wide wavelength range, and that can suppress a variation of aberrations, which vary depending on distances. Further, it is another object of the present invention to provide an imaging apparatus on which the imaging lens has been mounted.

An imaging lens of the present invention is an imaging lens comprising:
   a first group having a positive or negative refractive power;
   a second group having a positive refractive power; and
   a third group having a positive or negative refractive power, which are sequentially arranged from the object side of the imaging lens,
   wherein the first group includes an aperture stop, and
   wherein the second group includes positive lens L21, and cemented lens L20 composed of positive lens L22 and negative lens L23, and
   wherein the third group is composed of cemented lens L30 of positive lens L31 and negative lens L32, and
   wherein the following formula (1) is satisfied:

$$0.5 \leq f2/f \leq 1.2 \qquad (1),\text{ where}$$

f: focal length of the entire system of the imaging lens, and
   f2: focal length of the second group.

Since the imaging lens of the present invention is constructed as described above, it is possible to easily suppress various aberrations, such as longitudinal chromatic aberration, for a wide wavelength range from a visible light range to a near-infrared range. Further, it is possible to easily suppress variation of aberrations depending on distances.

Further, it is possible to sufficiently suppress various aberrations and to improve performance by appropriately adopting the following construction in the imaging lens of the present invention.

It is desirable that the imaging lens of the present invention satisfies the following formula (2):

$$-7.7 \leq f3/f1 \leq 15.0 \qquad (2),\text{ where}$$

f1: focal length of the first group, and
   f3: focal length of the third group.

Further, it is desirable that the first group is composed of a plurality of positive lenses, a negative lens, the negative refractive power of an image-side surface of the negative lens being stronger than the negative refractive power of an object-side surface of the negative lens, the aperture stop, and cemented lens L10 of a double-concave lens and a double-convex lens, which are sequentially arranged from the object side of the imaging lens. Further, when an average value of Abbe numbers of the double-concave lens and the double-convex lens constituting the cemented lens L10 for d-Line is ν1, it is desirable that the following formula (3) is satisfied:

$$65 \leq \nu 1 \qquad (3).$$

Further, when an average value of Abbe numbers of the negative lens L23 in the second group and the negative lens L32 in the third group for d-Line is ν23n, it is desirable that the following formula (4) is satisfied:

$$50 \leq \nu 23n \qquad (4).$$

In the imaging lens of the present invention, it is desirable that the second group moves, on the optical axis of the imaging lens, toward the object side of the imaging lens to focus the imaging lens on a short distance object.

An imaging apparatus of the present invention is an imaging apparatus comprising:
   an imaging lens of the present invention, and
   an imaging device that outputs an imaging signal corresponding to an optical image formed by the imaging lens.

Since the imaging apparatus of the present invention uses the high-resolution imaging lens of the present invention, it is possible to achieve high-resolution photography performance for a wide wavelength range.

The imaging lens of the present invention includes a first group having a positive or negative refractive power, a second group having a positive refractive power, and a third group having a positive or negative refractive power, which are sequentially arranged from the object side of the imaging lens. Further, the construction of each of the groups is optimized. Therefore, it is possible to achieve high-resolution performance in which longitudinal chromatic aberrations are suppressed for a wide wavelength range. Further, it is possible to realize an imaging lens of medium telephoto class in which variation of aberrations depending on distances is suppressed.

Since the imaging apparatus of the present invention uses the imaging lens of the present invention, which has high resolution performance, it is possible to achieve high-resolution imaging performance for a wide wavelength range.

BRIEF DESCRIPTION OF THE DRAWINGS

FIG. 14A is a diagram illustrating spherical aberration of an imaging lens of Example 4 when the imaging lens is focused on an object at infinity;

FIG. 14B is a diagram illustrating astigmatism of an imaging lens of Example 4 when the imaging lens is focused on an object at infinity;

FIG. 14C is a diagram illustrating distortion of an imaging lens of Example 4 when the imaging lens is focused on an object at infinity;

FIG. 15A is a diagram illustrating spherical aberration of an imaging lens of Example 4 when the imaging lens is focused on an object at a short distance;

FIG. 15B is a diagram illustrating astigmatism of an imaging lens of Example 4 when the imaging lens is focused on an object at a short distance;

FIG. 15C is a diagram illustrating distortion of an imaging lens of Example 4 when the imaging lens is focused on an object at a short distance;

FIG. 18A is a diagram illustrating spherical aberration of an imaging lens of Example 6 when the imaging lens is focused on an object at infinity;

FIG. 18B is a diagram illustrating astigmatism of an imaging lens of Example 6 when the imaging lens is focused on an object at infinity;

FIG. 18C is a diagram illustrating distortion of an imaging lens of Example 6 when the imaging lens is focused on an object at infinity;

FIG. 19A is a diagram illustrating spherical aberration of an imaging lens of Example 6 when the imaging lens is focused on an object at a short distance;

FIG. 19B is a diagram illustrating astigmatism of an imaging lens of Example 6 when the imaging lens is focused on an object at a short distance;

FIG. 19C is a diagram illustrating distortion of an imaging lens of Example 6 when the imaging lens is focused on an object at a short distance;

FIG. 23 is a diagram illustrating the configuration of an example of a network system for monitoring.

DESCRIPTION OF THE PREFERRED EMBODIMENTS

Hereinafter, embodiments of the present invention will be described in detail with reference to drawings.

[Lens Construction]

Figure 1:
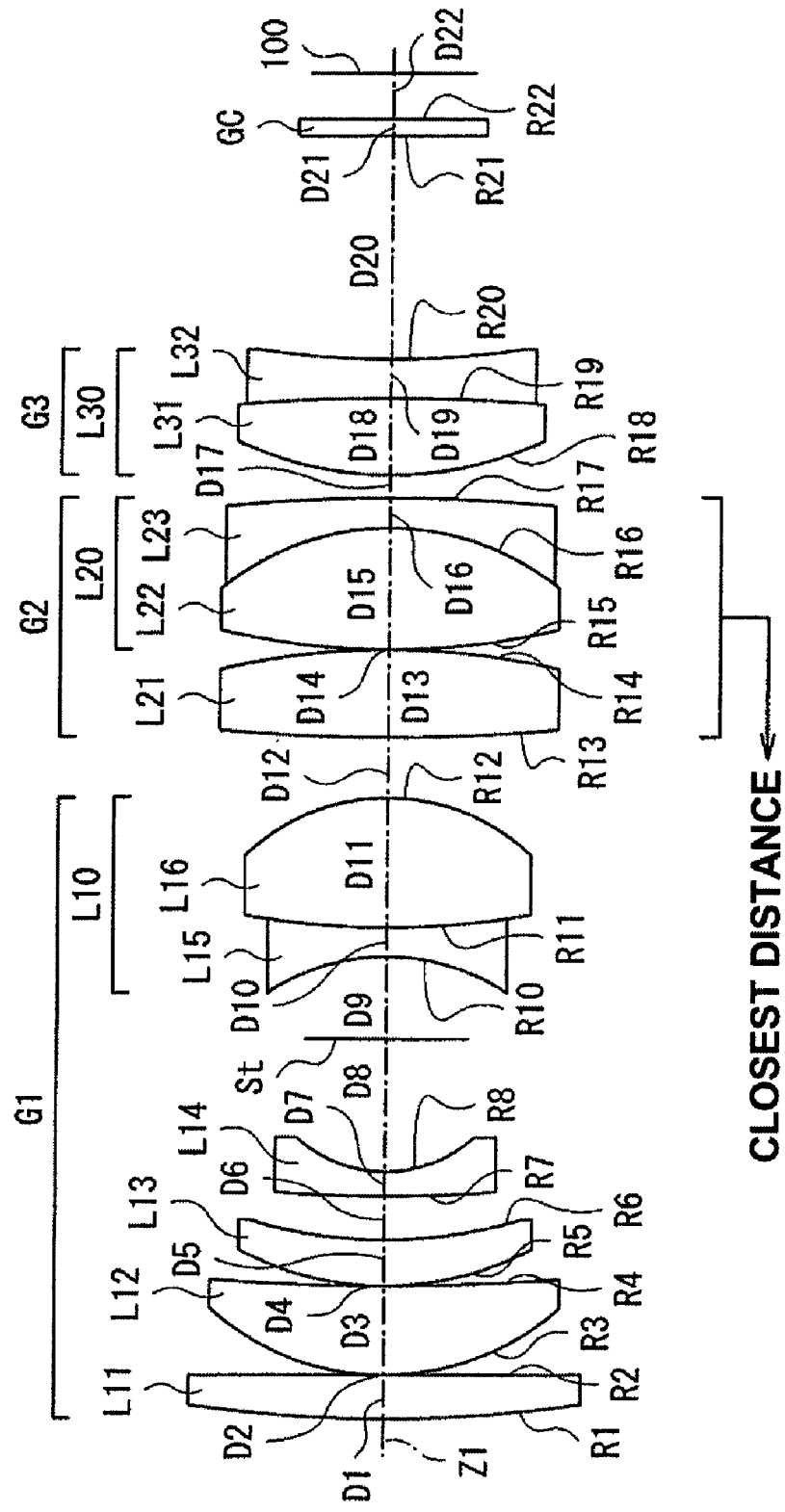
FIG. 1 is a diagram illustrating a first example of construction of an imaging lens according to an embodiment of the present invention, and which is a cross-section of a lens corresponding to Example 1.
Figure 2:
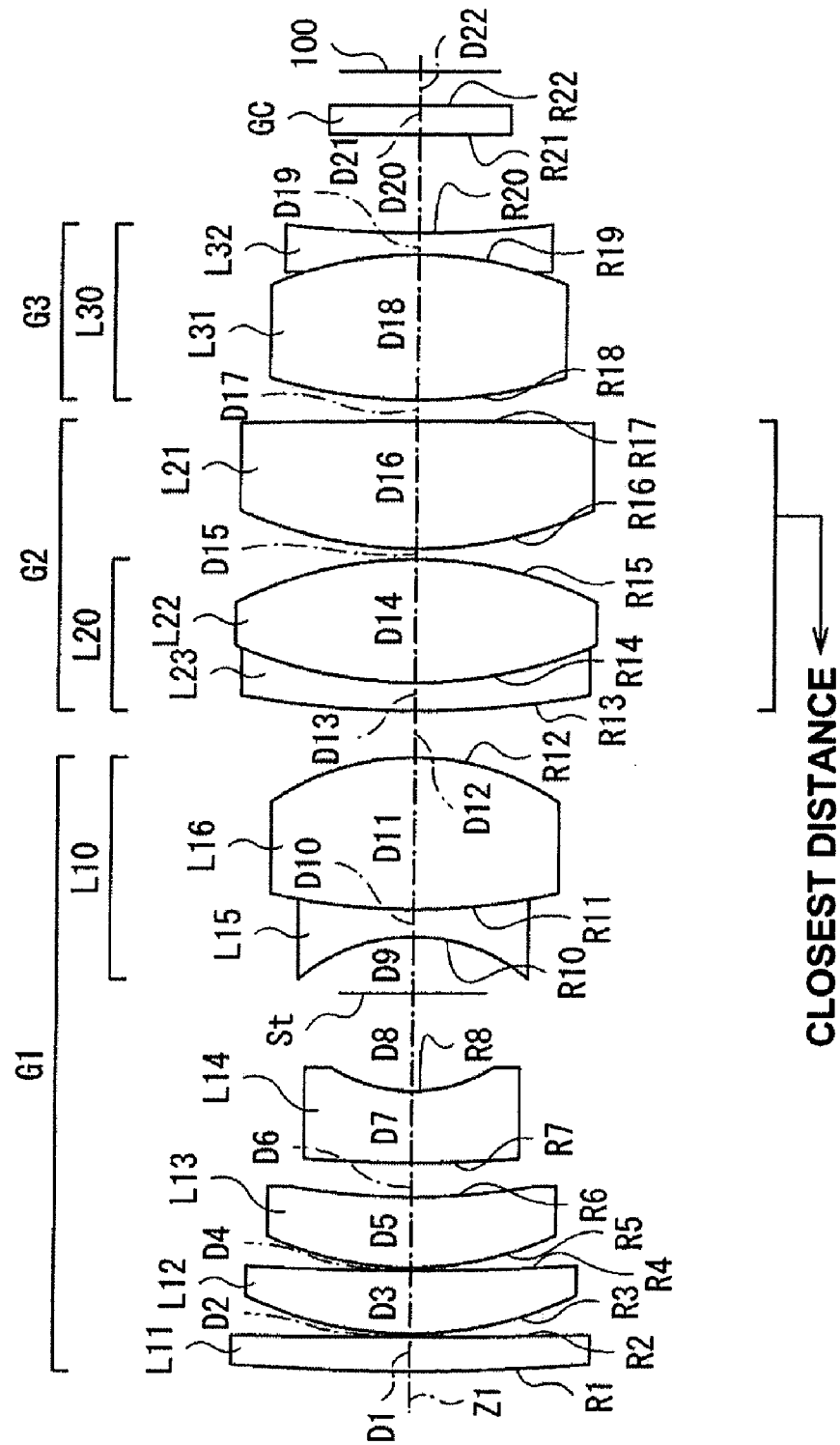
FIG. 2 is a diagram illustrating a second example of construction of an imaging lens, and which is a cross-section of a lens corresponding to Example 2.
Figure 3:
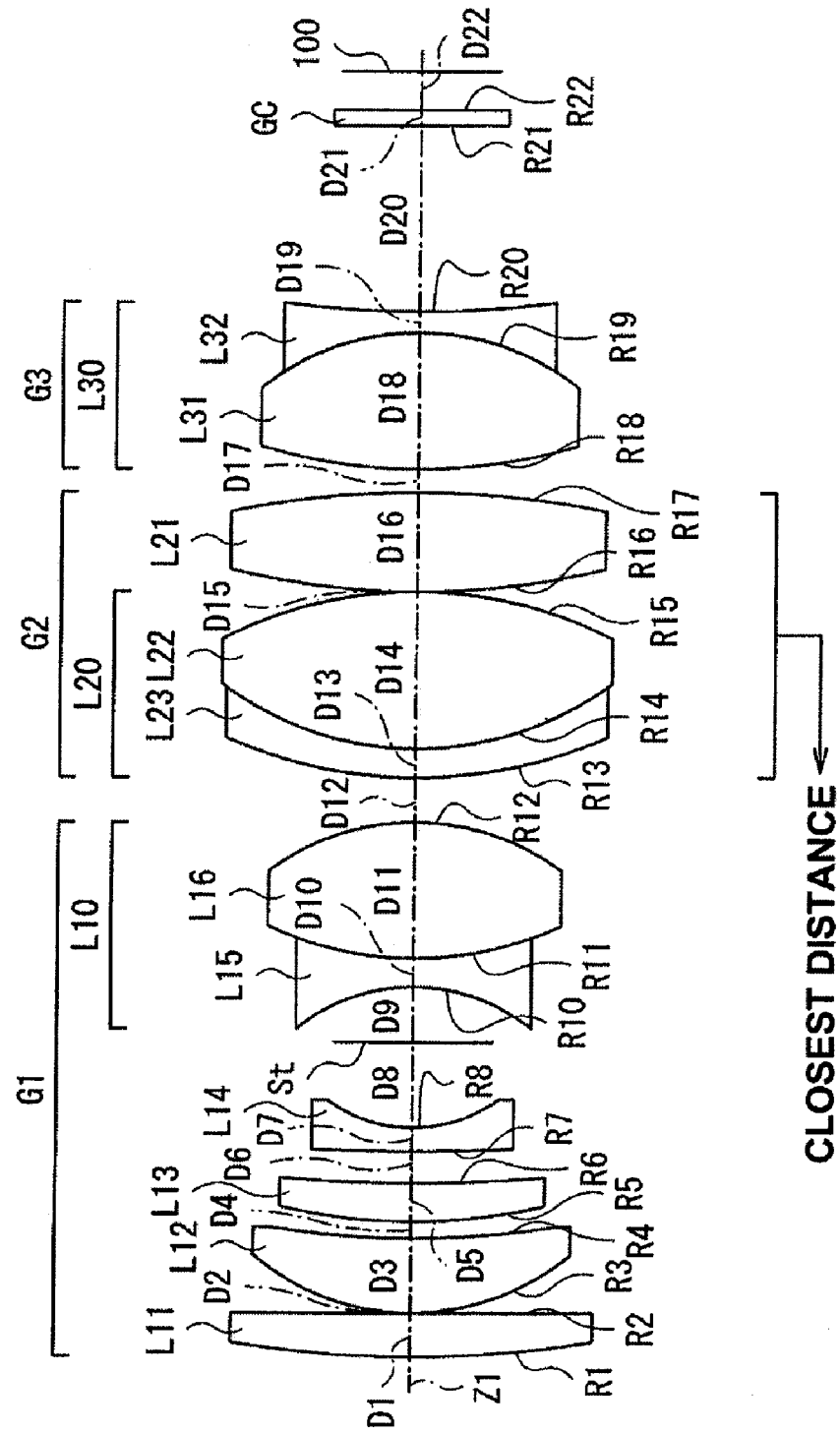
FIG. 3 is a diagram illustrating a third example of construction of an imaging lens, and which is a cross-section of a lens corresponding to Example 3.
Figure 4:
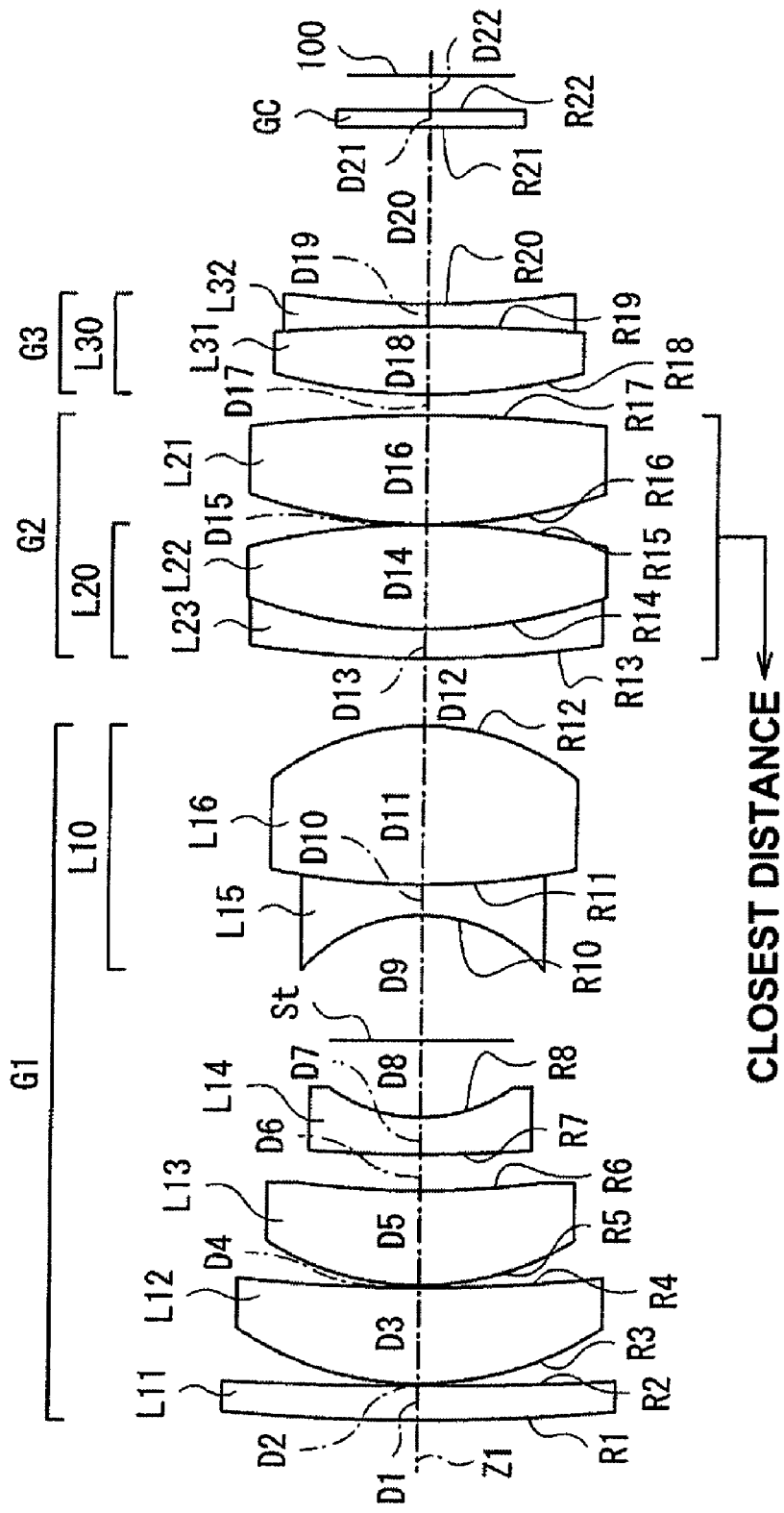
FIG. 4 is a diagram illustrating a fourth example of construction of an imaging lens, and which is a cross-section of a lens corresponding to Example 4.
Figure 5:
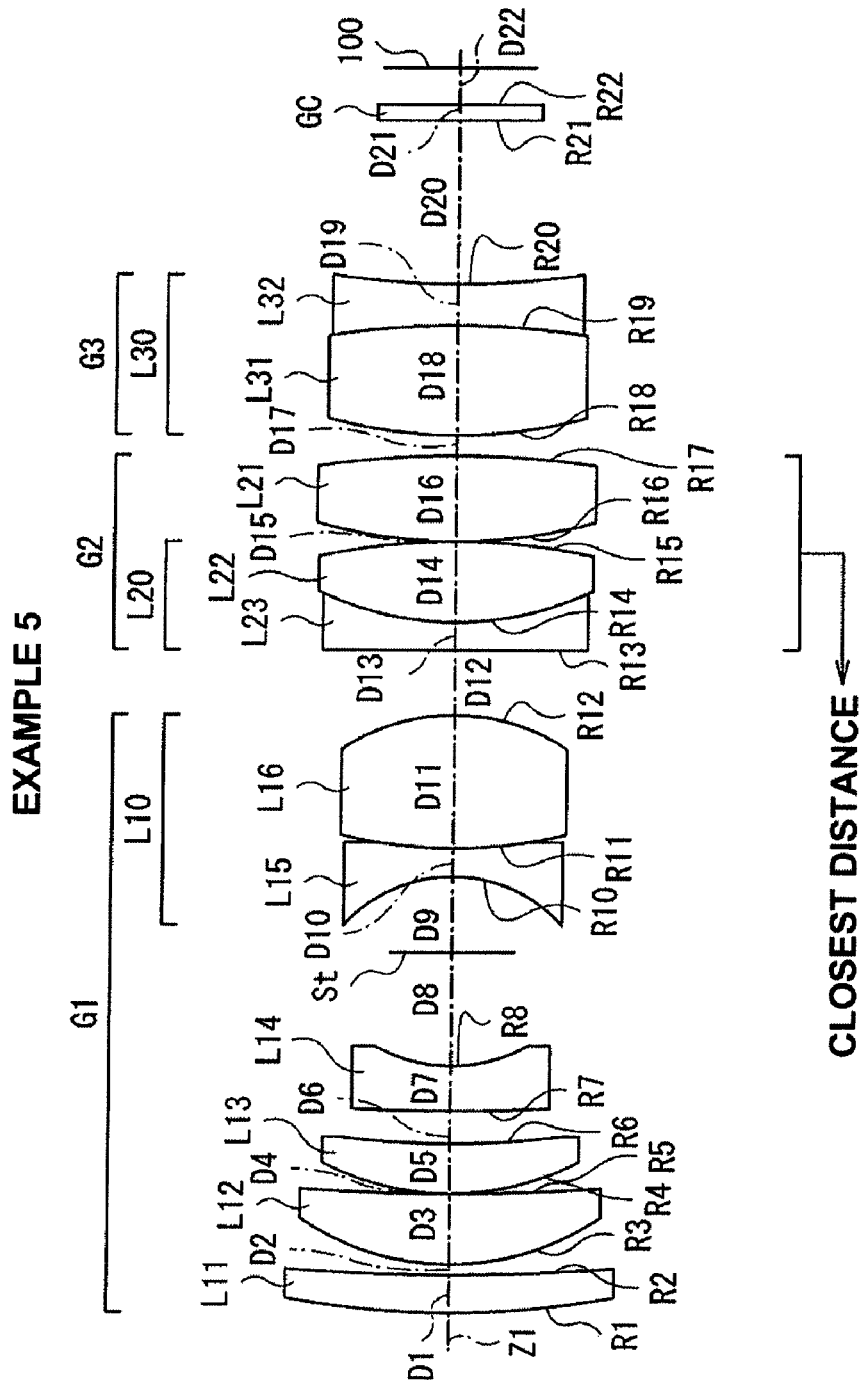
FIG. 5 is a diagram illustrating a fifth example of construction of an imaging lens, and which is a cross-section of a lens corresponding to Example 5.
Figure 6:
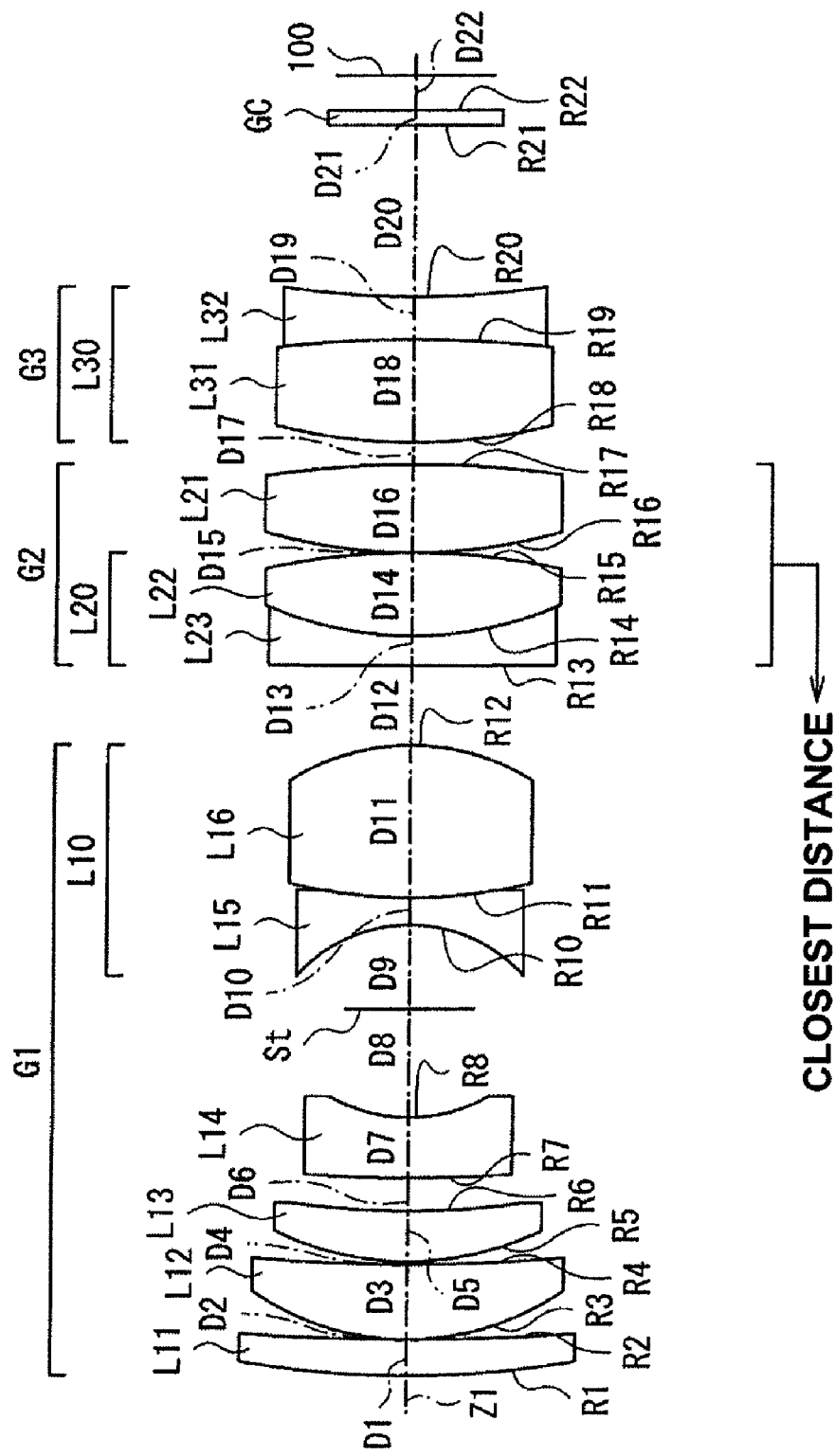
FIG. 6 is a diagram illustrating a sixth example of construction of an imaging lens, and which is a cross-section of a lens corresponding to Example 6.
Figure 7:
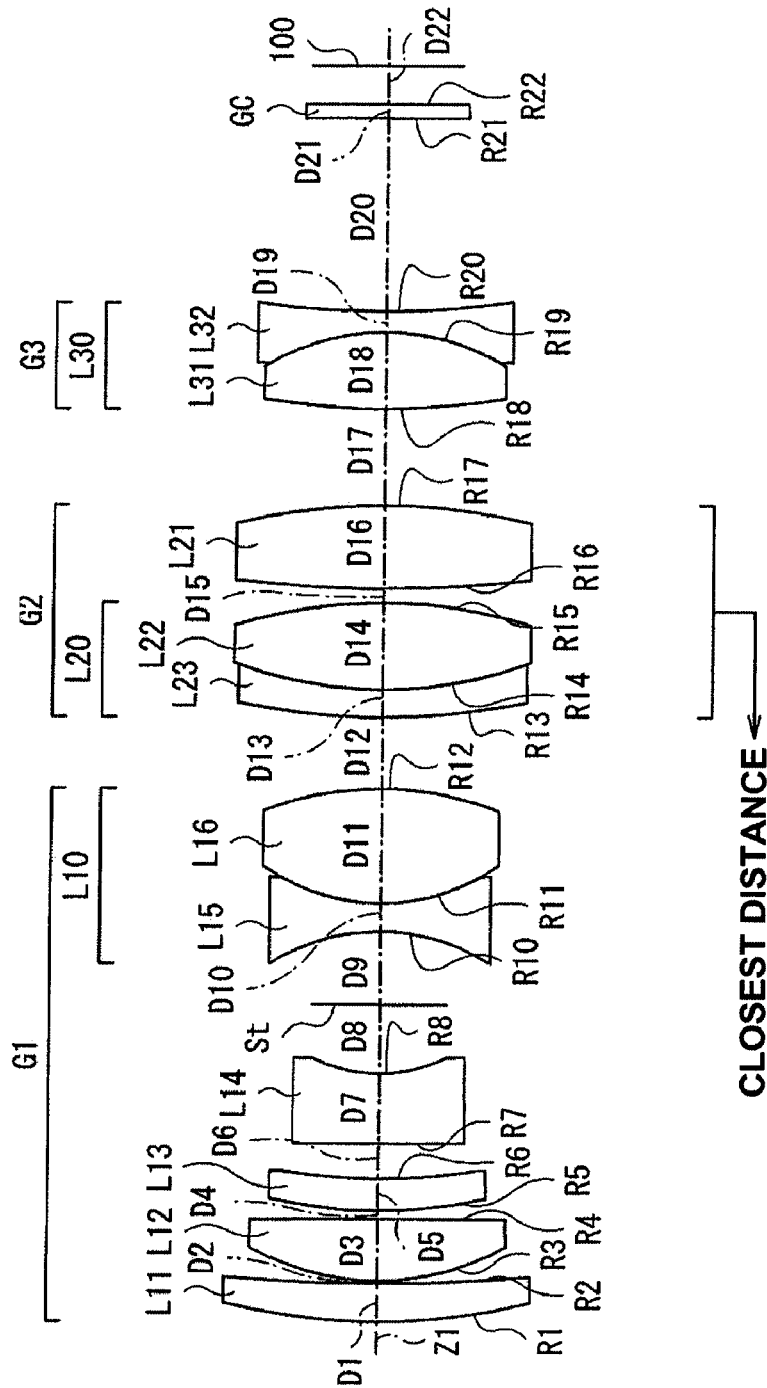
FIG. 7 is a diagram illustrating a seventh example of construction of an imaging lens, and which is a cross-section of a lens corresponding to Example 7.

FIG. 1 is a diagram illustrating a first example of the construction of an imaging lens according to an embodiment of the present invention. This example corresponds to the lens construction of a first example of numerical values, which will be described later. FIG. 1 corresponds to the arrangement of an optical system when the optical system is focused at infinity. Similarly, FIGS. 2 through 7 are diagrams illustrating cross-sections of second through seventh examples of the lens construction. The second through seventh examples of the lens construction correspond to second through seventh examples of numerical values, respectively, which will be described later. In FIGS. 1 through 7, the sign "Ri" represents the curvature radius of an i-th surface when the most-object-side surface of elements constituting the imaging lens is the first surface and the number of surface sequentially increases toward the image side (image formation side). The sign "Di" represents an interval between the i-th surface and the (i+1)th surface on optical axis Z1.

The imaging lens includes first group G1, which has a positive or negative refractive power, second group G2, which has a positive refractive power, and third group G3, which has a positive or negative refractive power. The first group G1, the second group G2 and the third group G3 are sequentially arranged along optical axis Z1 from the object side of the imaging lens. Optical aperture stop St is provided in the first group G1.

The imaging lens is a fixed focus lens that is appropriate for use as a medium telephoto lens. For example, the imaging lens is appropriate for being mounted on photography equipment that is used for monitoring both day and night. A member based on the construction of a photography unit of a photography camera on which the imaging lens is mounted is arranged on the image side of the imaging lens. For example, an imaging device 100, such as a CCD (Charge Coupled Device) and a CMOS (Complementary Metal Oxide Semiconductor), is arranged on the image formation side (imaging side) of the imaging lens. The imaging device 100 outputs imaging signals corresponding to an optical image formed by the imaging lens. An imaging apparatus according to an embodiment of the present invention includes at least the imaging lens and the imaging device 100. Further, various optical members GC may be arranged between the last lens group (third lens group G3) and the imaging device 100 based on the construction of a photography camera on which the lens is mounted. For example, a flat optical member, such as a cover glass for protecting the imaging plane and a infrared-ray cut filter, may be arranged.

The imaging lens is a so-called inner-focus lens, which is focused on a short distance object by sliding (moving) the second lens group G2 toward the object side of the imaging lens on the optical axis of the imaging lens.

The first group G1 is composed of a plurality of positive lenses (for example, three positive lenses L11, L12, and L13), negative lens L14, aperture stop St, and cemented lens L10, which are sequentially arranged from the object side of the imaging lens. The cemented lens L10 is composed of double-concave lens L15 and double-convex lens L16, which are sequentially arranged from the object side of the imaging lens.

The negative refractive power of the image-side surface of the negative lens L14 is stronger than the negative refractive power of the object-side surface of the negative lens L14. This means that the negative lens L14 has a concave surface having a strong refractive power on the image side of the negative lens L14. For example, a case in which the image-side surface of the negative lens L14 is concave and the object-side surface of the negative lens L14 is convex (negative meniscus form having a concave surface facing the image side), and a case in which the image-side surface of the negative lens L14 is concave and the object-side surface of the negative lens L14 is a flat plane (plano-concave form) may be included. Further, a case in which the negative lens L14 has double concave form, and the refractive power of the image-side concave surface of the negative lens L14 is stronger than the refractive power of the object-side concave surface of the negative lens L14 may be included.

The second lens group G2 is composed of positive lens L21 and cemented lens L20. The cemented lens L20 is composed of positive lens L22 and negative lens L23. In the first example of construction illustrated in FIG. 1, the cemented lens L20 is arranged on the image side of the positive lens L21. Further, the positive lens L21, the positive lens L22 and the negative lens L23 are sequentially arranged from the object side. In the second through seventh examples of construction illustrated in FIGS. 2 through 7, the cemented lens L20 is arranged on the object side of the positive lens L21. Further, the negative lens L23, the positive lens L22, and the positive lens L21 are sequentially arranged from the object side.

The third group G3 is composed of cemented lens L30 of positive lens L31 and negative lens L32.

It is desirable that the imaging lens optionally satisfies the following formulas:

$$0.5 \leq f2/f \leq 1.2 \qquad (1), \text{and}$$

$$-7.7 \leq f3/f \leq 15.0 \qquad (2), \text{where}$$

f: focal length of the entire system of the imaging lens,
f1: focal length of the first group G1, and
f2: focal length of the second group G2, and
f3: focal length of the third group G3.

Further, it is desirable that the imaging lens optionally satisfies the following formulas:

$$65 \leq v1 \quad (3), \text{ and}$$

$$50 \leq v23n \quad (4), \text{ where}$$

v1: an average value of Abbe numbers of the double-concave lens L15 and the double-convex lens L16 constituting the cemented lens L10 in the first group G1 for d-Line, and v23n: an average value of Abbe numbers of the negative lens L23 in the second group G2 and the negative lens L32 in the third group G3 for d-Line.

[Configuration of Imaging Apparatus]

Figure 22:
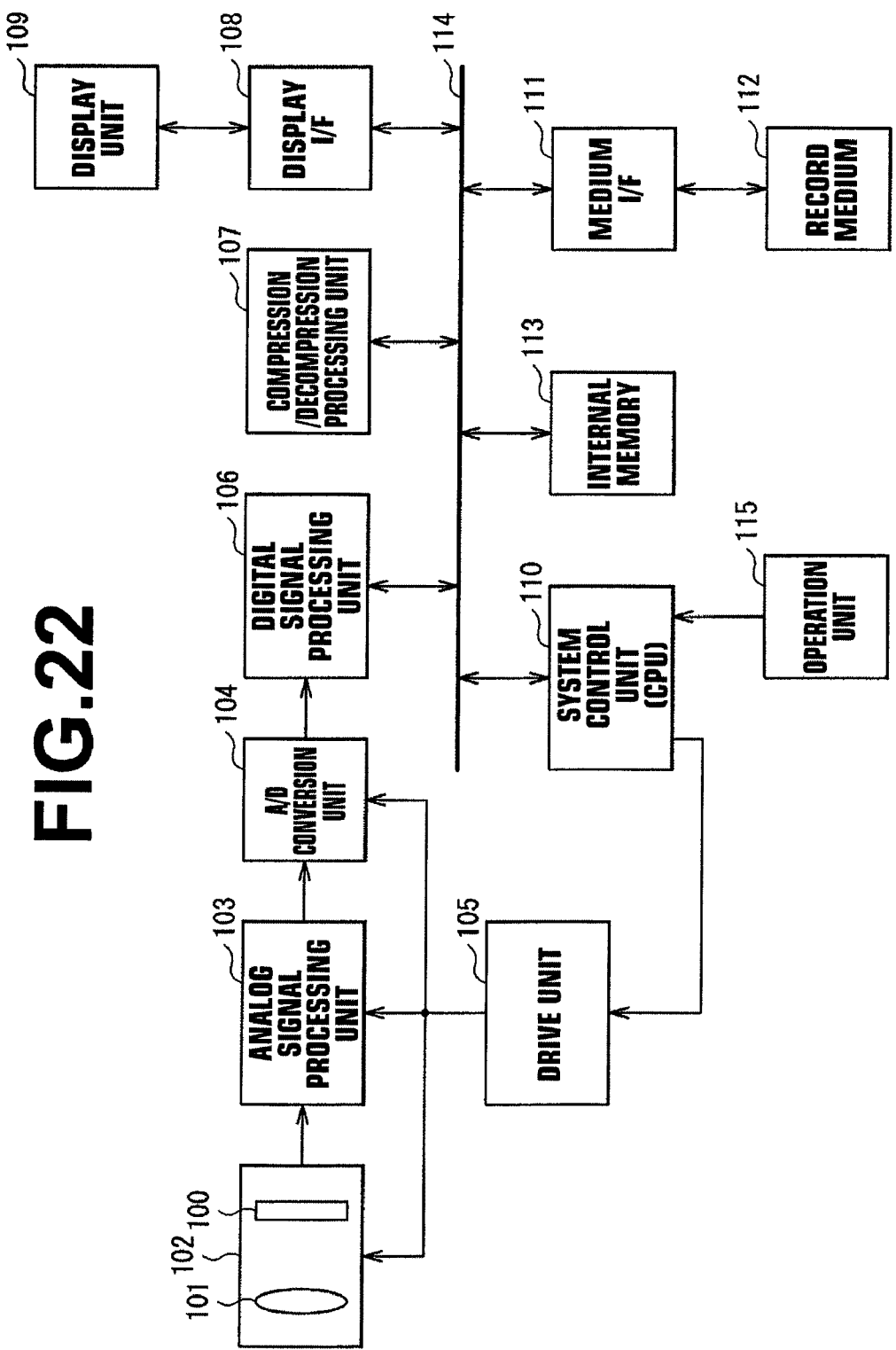
FIG. 22 is a block diagram illustrating an example of the configuration of an imaging apparatus (imaging system) according to an embodiment of the present invention.

FIG. 22 is a diagram illustrating an example of an imaging apparatus (imaging system) according to an embodiment of the present invention. The imaging apparatus includes an imaging unit 102, an analog signal processing unit 103, an A/D conversion unit 104, a drive unit 105, a digital signal processing unit 106, a compression/decompression processing unit 107, a display interface (I/F) 108, a display unit 109, a system control unit 110, an internal memory 113, a (record) medium interface (I/F) 111, a record medium 112, and an operation unit 115. The digital signal processing unit 106, the compression/decompression processing unit 107, the display interface 108, the system control unit 110, the internal memory 113, and the medium interface 111 are connected to a system bus 114.

The imaging unit 102 includes an imaging lens 101 and an imaging device 100. The imaging device 100 is, for example, a CCD, and outputs an analog imaging signal based on an image of a subject formed by the imaging lens 101. The analog signal processing unit 103 performs predetermined analog signal processing on the imaging signal sent from the imaging unit 102. The A/D conversion unit 104 converts the analog signal that has been processed by the analog signal processing unit 103 into a digital signal. When the imaging lens according to an embodiment of the present invention is used as the imaging lens 101, it is possible to obtain high-resolution analog imaging signals. Further, it is possible to generate, based on the high-resolution analog imaging signal, a high-resolution digital image in later circuits.

For example, when a predetermined photography mode (a mode in which a subject can be photographed and photographed image data can be recorded) is set, the drive unit 105 drives the imaging device 100, the analog signal processing unit 103 and the A/D conversion unit 104 by supplying predetermined pulses thereto based on drive pulses supplied from the system control unit 110. The photography mode may be, for example, a still-image photography mode or a motion-image photography mode. In the still-image photography mode, still-image data are recordable, and in the motion-image photography mode, motion-image data are recordable. Further, the drive unit 105 drives a predetermined movable group in the imaging lens 101 during focusing.

The digital signal processing unit 105 includes a DSP (Digital Signal Processor). The digital signal processing unit 105 generates photography image data by performing predetermined digital signal processing (image processing) on the digital signal sent from the A/D conversion unit 104 based on an operation mode set by the operation unit 115. The compression/decompression processing unit 107 performs compression processing on the photography image data generated by the digital signal processing unit 106. Further, the compression/decompression processing unit 107 performs decompression processing on the compressed image data obtained from the record medium 112.

The display unit 109 is, for example, an LCD (liquid crystal display), or the like. The display unit 109 can display an image based on photography image data on which digital signal processing has been performed. Further, the display unit 109 can display an image based on image data obtained by performing decompression processing on compressed image data recorded on the record medium 112. Further, the display unit 109 can display a so-called "through image" (a through-camera image, a through-the-lens image, or the like) when the imaging apparatus is set in photography mode, various conditions of a digital camera, information about operations, and the like.

The system control unit 110 includes a CPU (Central Processing Unit), which operates by a predetermined program. The system control unit 110 controls operations of the whole apparatus including imaging (photography) operations. The internal memory 113 is, for example, a DRAM (dynamic random-access memory). The internal memory 113 is used as a work memory for the digital signal processing unit 106 and the system control unit 110. Further, the internal memory 113 may be used as a buffer memory that temporarily stores imaged image data to be stored in the record medium 112, or as a buffer memory of image data for display to be displayed on the display unit 109. The medium interface 111 is used to input data to the record medium 112, such as a memory card, and to output data therefrom. The operation unit 115 performs various operations when the imaging apparatus is used. The operation unit 115 includes a release button (a shutter release button, or the like), which is not illustrated, to instruct imaging.

FIG. 23 is a diagram illustrating another example of the configuration of the imaging system according to an embodiment of the present invention. In the imaging system illustrated in FIG. 23, the imaging system is configured as a network system for monitoring. In FIG. 23, a monitor camera 202, a display apparatus 203, and a monitor control apparatus 204 are connected to a network 201, such as a LAN (Local Area Network), or the like. The display apparatus 203 is, for example, a liquid crystal display monitor, or the like. The monitor control apparatus 204 is a computer (computer apparatus) on which software for monitoring has been installed. A plurality of monitor cameras 202 may be connected to the network 201. An image or a video image obtained by the monitor camera 202 is displayed on the display apparatus 203 under control by the monitor control apparatus 20, and it is possible to monitor the image at a remote place. When the imaging lens according to an embodiment of the present invention is mounted on the monitor camera 202 of the imaging system, it is possible to obtain, for example, high-resolution monitor images (video images) for both day and night. Hence, excellent monitoring is possible both day and night.

[Action and Effect]

Next, the action and effect of the imaging lens constructed as described above will be described.

In the imaging lens, first group G1 having a positive or negative refractive power, second group G2 having a positive refractive power, and third group G3 having a positive or negative refractive power are sequentially arranged from the object side of the imaging lens. Further, the construction of each of the groups is optimized. Therefore, it is possible to achieve high-resolution performance in which the longitudinal chromatic aberration or the like is suppressed for a wide wavelength range. Further, it is possible to realize a medium-telephoto-class imaging lens in which variation of aberrations depending on distances is suppressed. Further, the imaging apparatus on which the imaging lens is mounted can achieve high-resolution imaging performance for a wide wavelength band, because the high-resolution imaging lens is used.

In the imaging lens, the front side of the first group G1 (front side of the aperture stop St) is constructed based on a front group part of a Gauss-type lens. Further, a plurality of cemented lenses L10, L20, and L30 are arranged on the image side of the aperture stop St. Such construction of the imaging lens is advantageous to correct longitudinal chromatic aberrations. In the imaging lens, the front side of the first group G1 is composed of a plurality of positive lenses and negative lens L14, which follows the plurality of positive lenses. Further, the image-side surface of the negative lens L14 is formed in predetermined shape (concave surface having a strong negative refractive power). In this case, axial rays are condensed into convergent rays by the plurality of positive lenses on the front side of the first lens group G1, and the convergent rays enter the negative lens L14. Since the image-side surface of the negative lens L14 is formed in the predetermined shape, it is possible to prevent high-order spherical aberrations.

Further, the imaging lens adopts an inner focus method in which the second lens group G2, which is a middle group, is moved to focus the imaging lens on a short-distance object. Therefore, it is possible to suppress variation of aberrations depending on the distance of photography, compared with a method of sliding (moving) the whole lens system, for example.

The formula (1) is related to focal length f2 of the second lens group G2. When the value of f2/f is lower than the lower limit of the formula (1), the focal length f2 of the second lens group G2 becomes small, and the back focus Bf of the entire system becomes short. Therefore, it is necessary to increase the negative refractive power of the third lens group G3 to compensate the decreased back focus Bf. Consequently, the image plane tends to become so-called "over", which means that the image plane deviates toward the rear side of the lens system. When the value of f2/f exceeds the upper limit of the formula (1), the positive refractive power of the second lens group G2 becomes weaker. Therefore, the image plane leans toward a so-called "over side", which is the rear side of the lens system. Further, the focal length of each of the lenses in the second group G2 becomes long. Therefore, the achromatic effect becomes weak, and the secondary spectrum of the longitudinal chromatic aberration increases.

To achieve higher optical performance, it is desirable that the numerical range of f2/f defined by the formula (1) satisfies the following formula (1'):

$$0.57 \leq f2/f \leq 1.2 \tag{1'}$$

To achieve even higher performance, it is desirable that the numerical range of f2/f is as follows:

$$0.59 \leq f2/f \leq 0.85 \tag{1''}$$

The formula (2) defines a condition that is necessary to regulate the balance of refractive powers between groups of the imaging lens. When the first group G1 has a negative refractive power, if the value of f3/f1 is lower than the lower limit of the formula (2), the focal length f1 of the first group G1 becomes short. Therefore, the positive refractive power of rear lens groups increases, and coma aberration increases. When the first group G1 has a positive refractive power, if the value of f3/f is lower than the lower limit of the formula (2), the negative refractive power of the third group G3 decreases. Hence, the back focus Bf of the entire system becomes short. When the first group G1 has a negative refractive power, if the value of f3/f exceeds the upper limit of the formula (2), the negative refractive power of the third group G3 decreases. Hence, the back focus Bf of the entire system becomes short. When the first lens group G1 has a positive refractive power, if the value of f3/f exceeds the upper limit of the formula (2), the positive refractive power of the first lens group G1 increases. Therefore, the back focus Bf of the entire system becomes short, and coma aberration tends to increase.

To achieve higher optical performance, it is desirable that the numerical range of f3/f1 defined by the formula (2) satisfies the following formula (2'):

$$-7.5 \leq f3/f1 \leq 15.0 \tag{2'}$$

To achieve even higher performance, it is desirable that the numerical range of f3/f1 is as follows:

$$-5.0 \leq f3/f1 \leq 5.0 \tag{2''}$$

The formula (3) is related to the lens material of the double concave lens L15 and the double convex lens L16, which constitute the cemented lens L10 in the first lens group G1. The formula (3) defines a condition for maintaining longitudinal chromatic aberrations in an excellent manner for a wide wavelength range. When the value of v1 becomes lower than the lower limit of the formula (3), the secondary spectrum of longitudinal chromatic aberration is not sufficiently corrected.

To correct longitudinal chromatic aberration more effectively, it is desirable that the numerical range of v1 defined by the formula (3) satisfies the following formula (3'):

$$70 \leq v1 \tag{3'}$$

Further, to correct longitudinal chromatic aberration even more effectively, it is desirable that the numerical range of v1 is as follows:

$$73 \leq v1 \tag{3''}$$

The formula (4) is related to the lens material of the negative lens L23 and the negative lens L32. The negative lens L23 constitutes the cemented lens L20 in the second group G2, and the negative lens L32 constitutes the cemented lens L30 in the third group G3. The formula (4) defines a condition for maintaining longitudinal chromatic aberrations in an excellent manner for a wide wavelength band. When the value of v23n is lower than the lower limit of the formula (4), the second spectrum of the longitudinal chromatic aberration is not sufficiently corrected.

EXAMPLES

Next, specific examples of numerical values of the imaging lens according to the embodiment of the present invention will be described. In a part of the following explanation, some of the examples will be described collectively.

Example 1 of Numerical Values

[Table 1] shows specific lens data corresponding to the construction of the imaging lens illustrated in FIG. 1. In the lens data shown in Table 1, column Si of surface numbers indicates the surface number of the i-th (i=1 through 22) surface of the imaging lens according to Example 1. In the column Si, the most-object-side surface (surface closest to the object) of elements constituting the imaging lens is the first surface, and the surface numbers sequentially increase toward the image side. Further, column Ri of curvature radii shows the curvature radius (mm) of the i-th surface from the object side. The curvature radii in the column Ri correspond to signs Ri (i=1 through 22) in FIG. 1. Column Di of surface intervals shows an interval (mm), on the optical axis of the imaging lens, between the i-th surface Si and the (i+1)th surface Si+1 when the surfaces are counted from the object side. Column Ndi shows a refractive index between the i-th surface Si and the (i+1)th surface Si+1 for d-line (587.6 nm) when the surfaces are counted from the object side. Further, column vdj shows the Abbe-number of a j-th optical element when the optical elements are counted from the object side.

TABLE 1

EXAMPLE 1 - BASIC LENS DATA

|  | Si (SURFACE NUMBER) | Ri (CURVATURE RADIUS) | Di (SURFACE INTERVAL) | Ndi (REFRACTIVE INDEX) | vdj (Abbe NUMBER) |
|---|---|---|---|---|---|
| G1 | 1 | 99.014 | 2.89 | 1.79999 | 29.8 |
|  | 2 | ∞ | 0.20 | 1.00000 |  |
|  | 3 | 18.606 | 5.95 | 1.49700 | 81.6 |
|  | 4 | 153.771 | 0.20 | 1.00000 |  |
|  | 5 | 24.596 | 2.88 | 1.61800 | 63.3 |
|  | 6 | 32.886 | 3.09 | 1.00000 |  |
|  | 7 | 207.907 | 1.50 | 1.72046 | 34.7 |
|  | 8 | 9.271 | 8.98 | 1.00000 |  |
|  | 9 (APERTURE STOP) | — | 5.56 | 1.00000 |  |
|  | 10 | −14.254 | 2.00 | 1.48749 | 70.2 |
|  | 11 | 63.776 | 8.74 | 1.43875 | 95.0 |
|  | 12 | −14.087 | 4.14 | 1.00000 |  |
| G2 | 13 | 135.800 | 5.82 | 1.49700 | 81.6 |
|  | 14 | −52.658 | 0.20 | 1.00000 |  |
|  | 15 | 58.080 | 8.13 | 1.49700 | 81.6 |
|  | 16 | −18.134 | 2.00 | 1.48749 | 70.2 |
|  | 17 | −114.013 | 1.50 | 1.00000 |  |
| G3 | 18 | 25.106 | 5.31 | 1.49700 | 81.6 |
|  | 19 | −131.168 | 2.64 | 1.74950 | 35.3 |
|  | 20 | 67.901 | 15.00 | 1.00000 |  |
|  | 21 | ∞ | 1.00 | 1.51680 | 64.2 |
|  | 22 | ∞ | 3.26 | 1.00000 |  |

Examples 2 through 7 of Numerical Values

Next, specific lens data corresponding to imaging lenses illustrated in FIGS. 2 through 7 will be described as Examples 2 through 7 in a manner similar to the imaging lens of Example 1. Tables 2 through 7 show the lens data for Examples 2 through 7, respectively.

TABLE 2

EXAMPLE 2 - BASIC LENS DATA

|  | Si (SURFACE NUMBER) | Ri (CURVATURE RADIUS) | Di (SURFACE INTERVAL) | Ndi (REFRACTIVE INDEX) | vdj (Abbe NUMBER) |
|---|---|---|---|---|---|
| G1 | 1 | 162.044 | 2.42 | 1.75519 | 27.5 |
|  | 2 | 1370.158 | 0.20 | 1.00000 |  |
|  | 3 | 26.391 | 4.47 | 1.49700 | 81.6 |
|  | 4 | 301.416 | 0.20 | 1.00000 |  |
|  | 5 | 25.288 | 4.90 | 1.61800 | 63.3 |
|  | 6 | 56.743 | 2.35 | 1.00000 |  |
|  | 7 | 95.884 | 5.00 | 1.72046 | 34.7 |
|  | 8 | 10.288 | 6.88 | 1.00000 |  |
|  | 9 (APERTURE STOP) | — | 3.93 | 1.00000 |  |
|  | 10 | −12.618 | 2.00 | 1.51633 | 64.1 |
|  | 11 | 47.187 | 10.54 | 1.49700 | 81.6 |
|  | 12 | −17.789 | 3.25 | 1.00000 |  |
| G2 | 13 | 67.659 | 2.00 | 1.48749 | 70.2 |
|  | 14 | 31.752 | 8.62 | 1.43857 | 95.0 |
|  | 15 | −27.667 | 0.73 | 1.0000 |  |
|  | 16 | 29.790 | 8.88 | 1.49700 | 81.6 |
|  | 17 | −1942.561 | 1.58 | 1.00000 |  |
| G3 | 18 | 36.220 | 10.17 | 1.49700 | 81.6 |
|  | 19 | −27.002 | 1.50 | 1.74950 | 35.3 |
|  | 20 | 60.029 | 7.00 | 1.0000 |  |
|  | 21 | ∞ | 2.00 | 1.51680 | 64.2 |
|  | 22 | ∞ | 2.40 | 1.00000 |  |

TABLE 3

| | EXAMPLE 3 - BASIC LENS DATA | | | | |
|---|---|---|---|---|---|
| | Si (SURFACE NUMBER) | Ri (CURVATURE RADIUS) | Di (SURFACE INTERVAL) | Ndi (REFRACTIVE INDEX) | νdj (Abbe NUMBER) |
| | 1 | 79.878 | 3.00 | 1.75519 | 27.5 |
| | 2 | ∞ | 0.20 | 1.00000 | |
| | 3 | 18.227 | 5.06 | 1.49700 | 81.6 |
| | 4 | 70.567 | 1.22 | 1.00000 | |
| | 5 | 43.001 | 2.78 | 1.61800 | 63.3 |
| | 6 | 140.531 | 2.24 | 1.00000 | |
| G1 | 7 | 1419.989 | 1.50 | 1.66680 | 33.0 |
| | 8 | 9.944 | 6.01 | 1.00000 | |
| | 9 (APERTURE STOP) | — | 3.92 | 1.00000 | |
| | 10 | −12.429 | 2.00 | 1.48749 | 70.2 |
| | 11 | 24.773 | 9.44 | 1.43875 | 95.0 |
| | 12 | −18.143 | 3.25 | 1.00000 | |
| | 13 | 33.833 | 2.00 | 1.80400 | 46.6 |
| | 14 | 23.323 | 11.09 | 1.49700 | 81.6 |
| G2 | 15 | −28.896 | 0.10 | 1.00000 | |
| | 16 | 66.553 | 6.80 | 1.49700 | 81.6 |
| | 17 | −66.553 | 1.57 | 1.00000 | |
| | 18 | 39.479 | 9.53 | 1.49700 | 81.6 |
| G3 | 19 | −18.426 | 1.50 | 1.69679 | 55.5 |
| | 20 | 66.418 | 13.00 | 1.00000 | |
| | 21 | ∞ | 1.00 | 1.51680 | 64.2 |
| | 22 | ∞ | 2.78 | 1.00000 | |

TABLE 4

| | EXAMPLE 4 - BASIC LENS DATA | | | | |
|---|---|---|---|---|---|
| | Si (SURFACE NUMBER) | Ri (CURVATURE RADIUS) | Di (SURFACE INTERVAL) | Ndi (REFRACTIVE INDEX) | νdj (Abbe NUMBER) |
| | 1 | 148.840 | 2.39 | 1.75519 | 27.5 |
| | 2 | 288.427 | 0.20 | 1.00000 | |
| | 3 | 22.261 | 6.44 | 1.43875 | 95.0 |
| | 4 | 105.140 | 0.20 | 1.00000 | |
| | 5 | 20.002 | 6.41 | 1.61800 | 63.3 |
| | 6 | 70.872 | 2.45 | 1.00000 | |
| G1 | 7 | 107.569 | 2.45 | 1.72046 | 34.7 |
| | 8 | 11.031 | 5.15 | 1.00000 | |
| | 9 (APERTURE STOP) | — | 8.53 | 1.00000 | |
| | 10 | −10.635 | 2.00 | 1.48749 | 70.2 |
| | 11 | 52.629 | 10.76 | 1.43875 | 95.0 |
| | 12 | −16.347 | 4.53 | 1.00000 | |
| | 13 | 86.355 | 2.00 | 1.48749 | 70.2 |
| | 14 | 37.215 | 7.06 | 1.49700 | 81.6 |
| G2 | 15 | −47.076 | 0.10 | 1.00000 | |
| | 16 | 38.060 | 7.26 | 1.49700 | 81.6 |
| | 17 | −108.453 | 1.50 | 1.00000 | |
| | 18 | 39.788 | 4.60 | 1.49700 | 81.6 |
| G3 | 19 | −125.087 | 1.50 | 1.74950 | 35.3 |
| | 20 | 64.095 | 12.00 | 1.00000 | |
| | 21 | ∞ | 1.00 | 1.51680 | 64.2 |
| | 22 | ∞ | 2.47 | 1.00000 | |

TABLE 5

EXAMPLE 5 - BASIC LENS DATA

| | Si (SURFACE NUMBER) | Ri (CURVATURE RADIUS) | Di (SURFACE INTERVAL) | Ndi (REFRACTIVE INDEX) | vdj (Abbe NUMBER) |
|---|---|---|---|---|---|
| | 1 | 63.669 | 2.72 | 1.75519 | 27.5 |
| | 2 | 117.684 | 0.79 | 1.00000 | |
| | 3 | 19.248 | 5.23 | 1.43875 | 95.0 |
| | 4 | 183.803 | 0.20 | 1.00000 | |
| | 5 | 23.307 | 3.44 | 1.61800 | 63.3 |
| | 6 | 66.503 | 2.41 | 1.00000 | |
| G1 | 7 | 194.453 | 3.29 | 1.72046 | 34.7 |
| | 8 | 11.437 | 8.29 | 1.00000 | |
| | 9 (APERTURE STOP) | — | 5.53 | 1.00000 | |
| | 10 | −10.755 | 2.06 | 1.48749 | 70.2 |
| | 11 | 36.383 | 9.75 | 1.43875 | 95.0 |
| | 12 | −15.094 | 4.84 | 1.00000 | |
| | 13 | −446.154 | 2.00 | 1.48749 | 70.2 |
| G2 | 14 | 23.573 | 5.89 | 1.49700 | 81.6 |
| | 15 | −48.886 | 0.10 | 1.00000 | |
| | 16 | 41.479 | 6.16 | 1.49700 | 81.6 |
| | 17 | −71.592 | 1.50 | 1.00000 | |
| | 18 | 37.275 | 8.10 | 1.49700 | 81.6 |
| G3 | 19 | −55.572 | 3.00 | 1.71299 | 53.9 |
| | 20 | 64.351 | 12.00 | 1.00000 | |
| | 21 | ∞ | 1.00 | 1.51680 | 64.2 |
| | 22 | ∞ | 2.69 | 1.00000 | |

TABLE 6

EXAMPLE 6 - BASIC LENS DATA

| | Si (SURFACE NUMBER) | Ri (CURVATURE RADIUS) | Di (SURFACE INTERVAL) | Ndi (REFRACTIVE INDEX) | vdj (Abbe NUMBER) |
|---|---|---|---|---|---|
| | 1 | 73.493 | 2.47 | 1.75519 | 27.5 |
| | 2 | 140.266 | 0.20 | 1.00000 | |
| | 3 | 19.892 | 5.21 | 1.43875 | 95.0 |
| | 4 | 162.063 | 0.20 | 1.00000 | |
| | 5 | 22.847 | 3.45 | 1.61800 | 63.3 |
| | 6 | 64.948 | 2.35 | 1.00000 | |
| G1 | 7 | 129.226 | 4.21 | 1.72046 | 34.7 |
| | 8 | 11.338 | 7.58 | 1.00000 | |
| | 9 (APERTURE STOP) | — | 5.83 | 1.00000 | |
| | 10 | −10.766 | 2.00 | 1.48749 | 70.2 |
| | 11 | 39.107 | 10.61 | 1.43875 | 95.0 |
| | 12 | −15.596 | 5.60 | 1.00000 | |
| | 13 | 3634.929 | 2.00 | 1.48749 | 70.2 |
| | 14 | 26.279 | 5.77 | 1.49700 | 81.6 |
| G2 | 15 | −50.397 | 0.10 | 1.00000 | |
| | 16 | 40.200 | 6.14 | 1.49700 | 81.6 |
| | 17 | −81.771 | 1.50 | 1.00000 | |
| | 18 | 37.061 | 7.29 | 1.4970 | 81.6 |
| G3 | 19 | −88.905 | 2.99 | 1.74399 | 44.8 |
| | 20 | 64.137 | 12.00 | 1.00000 | |
| | 21 | ∞ | 1.00 | 1.51680 | 64.2 |
| | 22 | ∞ | 2.50 | 1.00000 | |

TABLE 7

EXAMPLE 7 - BASIC LENS DATA

| | Si (SURFACE NUMBER) | Ri (CURVATURE RADIUS) | Di (SURFACE INTERVAL) | Ndi (REFRACTIVE INDEX) | vdj (Abbe NUMBER) |
|---|---|---|---|---|---|
| G1 | 1 | 43.055 | 2.82 | 1.74949 | 35.3 |
| | 2 | 125.846 | 0.20 | 1.00000 | |
| | 3 | 18.617 | 4.49 | 1.43875 | 95.0 |
| | 4 | −930.122 | 0.59 | 1.00000 | |
| | 5 | 35.289 | 2.33 | 1.58913 | 61.1 |
| | 6 | 45.773 | 2.61 | 1.00000 | |
| | 7 | −279.675 | 5.00 | 1.72046 | 34.7 |
| | 8 | 10.869 | 4.98 | 1.00000 | |
| | 9 (APERTURE STOP) | — | 5.33 | 1.00000 | |
| | 10 | −14.762 | 2.00 | 1.48749 | 70.2 |
| | 11 | 14.547 | 8.30 | 1.49700 | 81.6 |
| | 12 | −22.939 | 5.17 | 1.00000 | |
| G2 | 13 | 53.232 | 2.00 | 1.48749 | 70.2 |
| | 14 | 30.445 | 6.29 | 1.43875 | 95.0 |
| | 15 | −35.460 | 1.00 | 1.00000 | |
| | 16 | 90.000 | 6.06 | 1.49700 | 81.6 |
| | 17 | −44.216 | 6.95 | 1.00000 | |
| G3 | 18 | 53.978 | 5.60 | 1.49700 | 81.6 |
| | 19 | −16.502 | 1.50 | 1.60300 | 65.4 |
| | 20 | 66.412 | 5.00 | 1.00000 | |
| | 21 | ∞ | 1.00 | 1.51680 | 64.2 |
| | 22 | ∞ | 11.79 | 1.00000 | |

Tables 1 through 7 show lens data when the imaging lenses are focused at infinity. Each of the imaging lenses of Examples 1 through 7 is focused on a short distance object by sliding (moving), on the optical axis, the second group G2 toward the object side. Table 8 shows slide amounts (movement amounts) (mm) of the second group G2 when each of the imaging lenses of Examples 1 through 7 is focused on a closest distance object from a state focused at infinity.

TABLE 8

| | EXAMPLE 1 | EXAMPLE 2 | EXAMPLE 3 | EXAMPLE 4 | EXAMPLE 5 | EXAMPLE 6 | EXAMPLE 7 |
|---|---|---|---|---|---|---|---|
| CLOSEST DISTANCE | 0.75 m | 0.75 m | 0.75 m | 1.0 m | 1.0 m | 1.0 m | 1.0 m |
| SLIDE AMOUNT | 2.85 | 1.67 | 1.68 | 2.54 | 2.85 | 2.86 | 2.26 |

Table 9 shows values related to the aforementioned formulas for each of Examples 1 through 7. In Table 9, Bf represents back focus (back focal length in air). Further, v1 CONCAVE represents the Abbe number of the double concave lens L15 in the cemented lens L10 for d-line. Further, v1 CONVEX represents the Abbe number of the double convex lens L16 in the cemented lens L10 for d-line. Further, v2n represents the Abbe number of the negative lens L23 in the second group G2 for d-line, and van represents the Abbe number of the negative lens 132 in the third group G3 for d-line. As Table 9 shows, all of Examples 1 through 7 satisfy the numerical ranges defined by the formulas (1), (2), (3) and (4).

TABLE 9

| | EXAMPLE 1 | EXAMPLE 2 | EXAMPLE 3 | EXAMPLE 4 | EXAMPLE 5 | EXAMPLE 6 | EXAMPLE 7 |
|---|---|---|---|---|---|---|---|
| f | 35.01 | 34.71 | 35.01 | 49.69 | 49.69 | 49.70 | 50.00 |
| Bf | 18.92 | 10.71 | 16.44 | 15.13 | 15.35 | 15.16 | 17.45 |
| f1 | −878.21 | −364.46 | −115.15 | 488.75 | 389.16 | 366.61 | −324.82 |
| f2 | 39.35 | 27.22 | 25.99 | 30.83 | 35.86 | 35.52 | 29.46 |
| f3 | 124.31 | −166.02 | −142.63 | −1696.63 | −2747.43 | 5360.06 | −174.35 |
| f2/f | 1.12 | 0.78 | 0.74 | 0.62 | 0.72 | 0.71 | 0.59 |
| f3/f1 | −0.14 | 0.46 | 1.24 | −3.47 | −7.06 | 14.62 | 0.54 |
| v1 CONCAVE | 70.2 | 64.1 | 70.2 | 70.2 | 70.2 | 70.2 | 70.2 |
| v1 CONVEX | 95.0 | 81.6 | 95.0 | 95.0 | 95.0 | 95.0 | 81.6 |
| v1 | 82.6 | 72.9 | 82.6 | 82.6 | 82.6 | 82.6 | 75.9 |
| v2n | 70.2 | 70.2 | 46.6 | 70.2 | 70.2 | 70.2 | 70.2 |
| v3n | 35.3 | 35.3 | 55.5 | 35.3 | 35.3 | 44.8 | 65.4 |
| v23n | 52.8 | 52.8 | 51.1 | 52.8 | 62.1 | 57.5 | 67.8 |

[Aberration Performance]

Figure 8A:
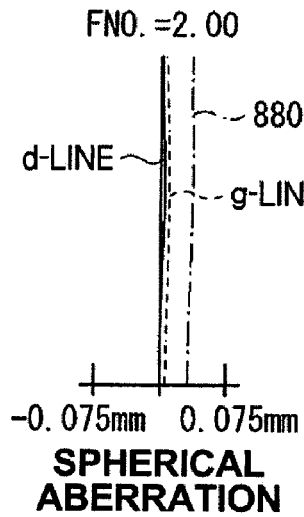
FIG. 8A is a diagram illustrating spherical aberration of an imaging lens of Example 1 when the imaging lens is focused on an object at infinity.
Figure 8B:
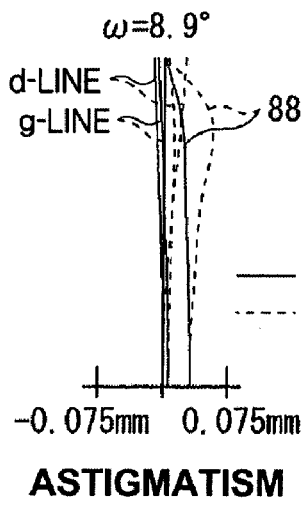
FIG. 8B is a diagram illustrating astigmatism of an imaging lens of Example 1 when the imaging lens is focused on an object at infinity.
Figure 8C:
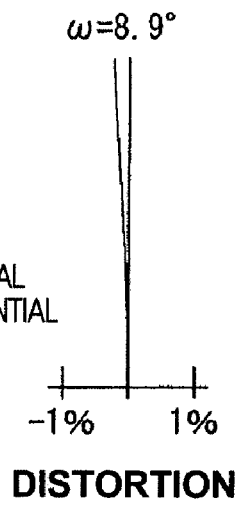
FIG. 8C is a diagram illustrating distortion of an imaging lens of Example 1 when the imaging lens is focused on an object at infinity.
Figure 9A:
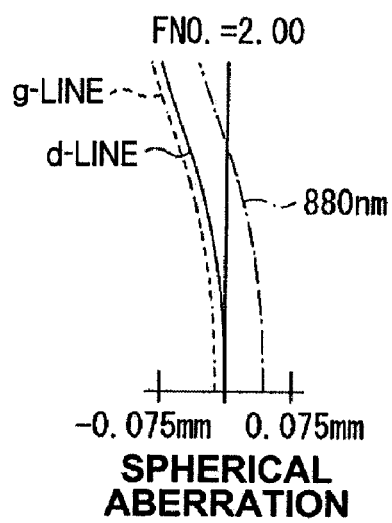
FIG. 9A is a diagram illustrating spherical aberration of an imaging lens of Example 1 when the imaging lens is focused on an object at a short distance.
Figure 9B:
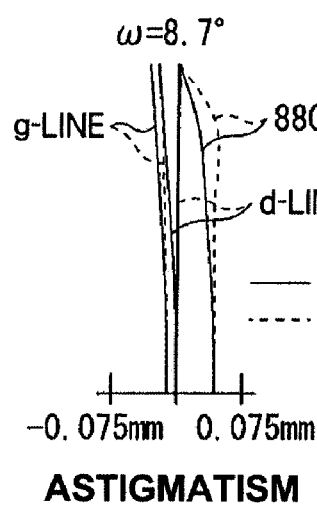
FIG. 9B is a diagram illustrating astigmatism of an imaging lens of Example 1 when the imaging lens is focused on an object at a short distance.
Figure 9C:
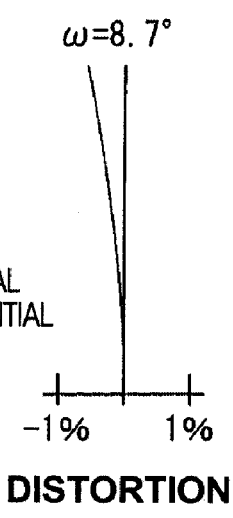
FIG. 9C is a diagram illustrating distortion of an imaging lens of Example 1 when the imaging lens is focused on an object at a short distance.

FIGS. 8A through 8C are diagrams illustrating spherical aberrations, astigmatism and distortion (distortion aberration) of the imaging lens of Example 1, respectively, when the imaging lens is focused at infinity. FIGS. 9A through 9C are diagrams illustrating spherical aberrations, astigmatism and distortion of the imaging lens of Example 1, respectively, when the imaging lens of Example 1 is focused on a short distance object. In each of the diagrams, d-line (587.6 nm) is used as a reference wavelength. In the diagrams of spherical aberrations and astigmatism, aberrations for g-line (435.8 nm) and for the wavelength of 880 nm are also illustrated. In the diagrams of astigmatism, aberrations in the sagittal directions are indicated by solid lines, and aberrations in the tangential directions are indicated by broken lines. Further, FNO. represents F-number, and ω represents a half angle of view.

Figure 10A:
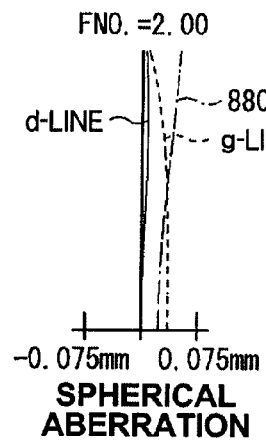
FIG. 10A is a diagram illustrating spherical aberration of an imaging lens of Example 2 when the imaging lens is focused on an object at infinity.
Figure 10B:
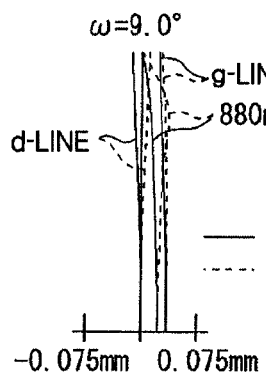
FIG. 10B is a diagram illustrating astigmatism of an imaging lens of Example 2 when the imaging lens is focused on an object at infinity.
Figure 10C:
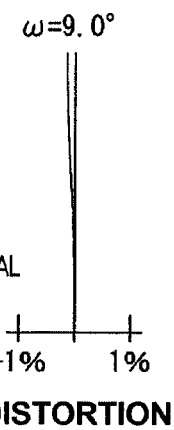
FIG. 10C is a diagram illustrating distortion of an imaging lens of Example 2 when the imaging lens is focused on an object at infinity.
Figure 11A:
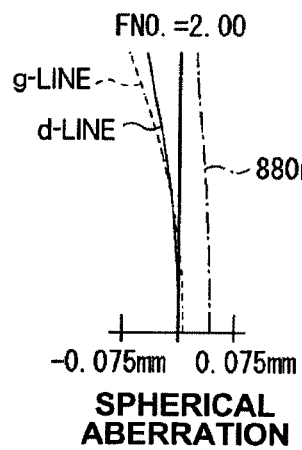
FIG. 11A is a diagram illustrating spherical aberration of an imaging lens of Example 2 when the imaging lens is focused on an object at a short distance.
Figure 11B:
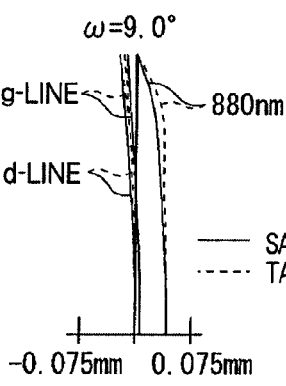
FIG. 11B is a diagram illustrating astigmatism of an imaging lens of Example 2 when the imaging lens is focused on an object at a short distance.
Figure 11C:
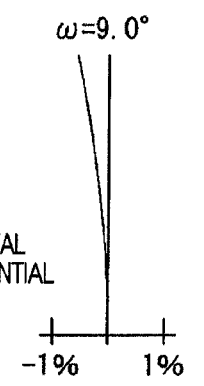
FIG. 11C is a diagram illustrating distortion of an imaging lens of Example 2 when the imaging lens is focused on an object at a short distance.
Figure 12A:
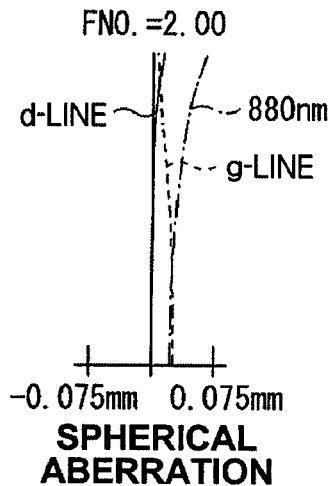
FIG. 12A is a diagram illustrating spherical aberration of an imaging lens of Example 3 when the imaging lens is focused on an object at infinity.
Figure 12B:
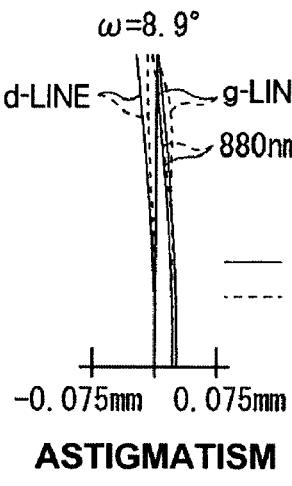
FIG. 12B is a diagram illustrating astigmatism of an imaging lens of Example 3 when the imaging lens is focused on an object at infinity.
Figure 12C:
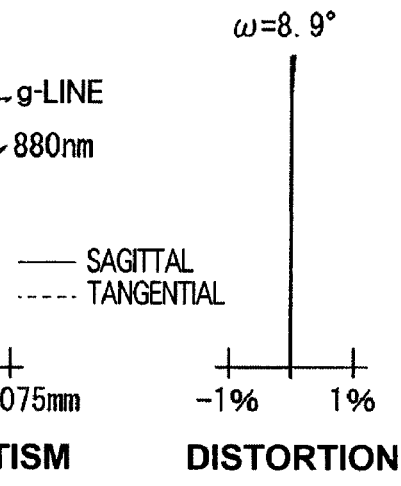
FIG. 12C is a diagram illustrating distortion of an imaging lens of Example 3 when the imaging lens is focused on an object at infinity.
Figure 13A:
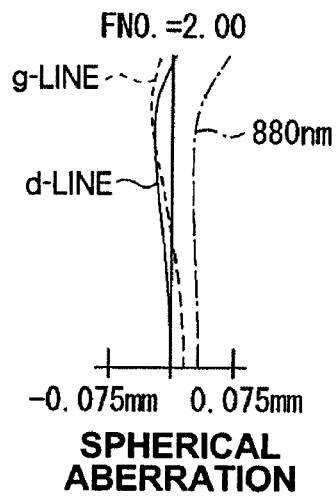
FIG. 13A is a diagram illustrating spherical aberration of an imaging lens of Example 3 when the imaging lens is focused on an object at a short distance.
Figure 13B:
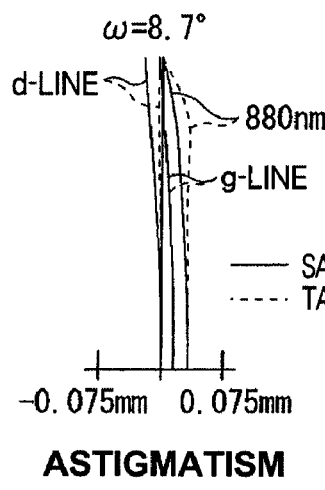
FIG. 13B is a diagram illustrating astigmatism of an imaging lens of Example 3 when the imaging lens is focused on an object at a short distance.
Figure 13C:
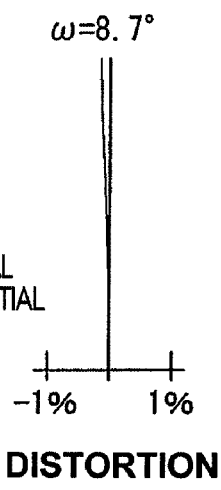
FIG. 13C is a diagram illustrating distortion of an imaging lens of Example 3 when the imaging lens is focused on an object at a short distance.
Figures 16A, 16B, 16C:
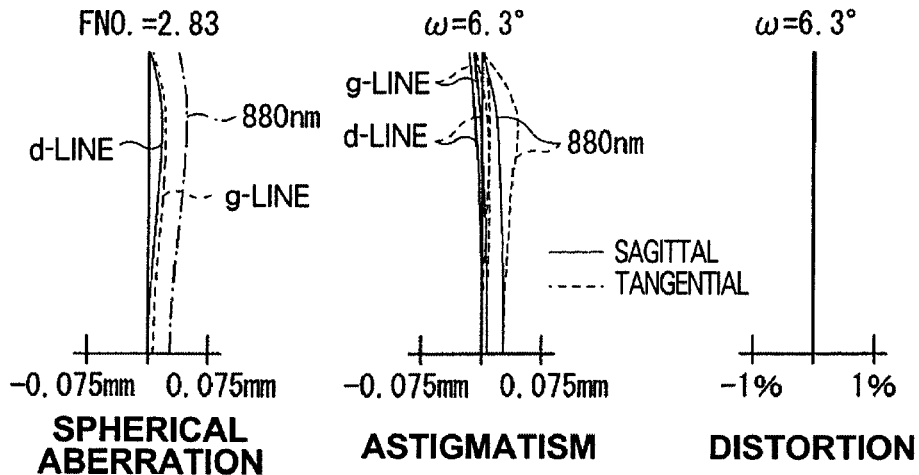
FIG. 16A is a diagram illustrating spherical aberration of an imaging lens of Example 5 when the imaging lens is focused on an object at infinity.
FIG. 16B is a diagram illustrating astigmatism of an imaging lens of Example 5 when the imaging lens is focused on an object at infinity.
FIG. 16C is a diagram illustrating distortion of an imaging lens of Example 5 when the imaging lens is focused on an object at infinity.
Figures 17A, 17B, 17C:
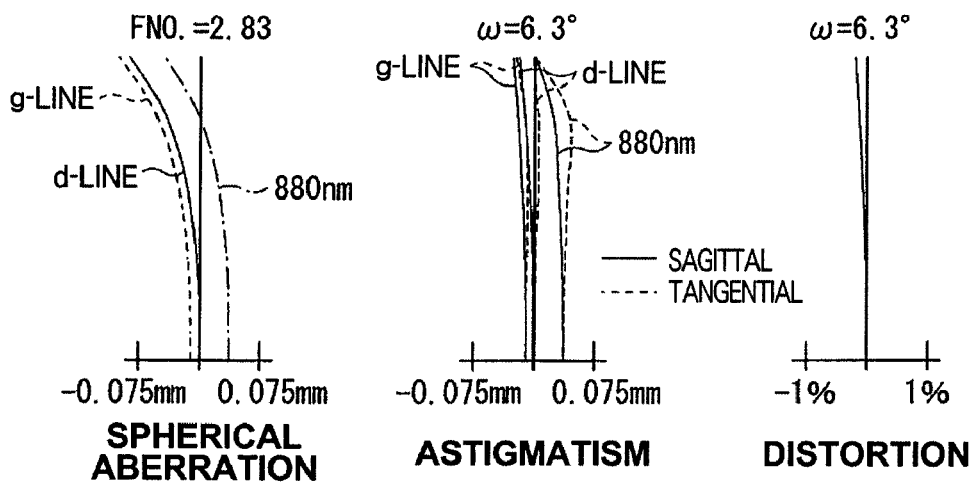
FIG. 17A is a diagram illustrating spherical aberration of an imaging lens of Example 5 when the imaging lens is focused on an object at a short distance.
FIG. 17B is a diagram illustrating astigmatism of an imaging lens of Example 5 when the imaging lens is focused on an object at a short distance.
FIG. 17C is a diagram illustrating distortion of an imaging lens of Example 5 when the imaging lens is focused on an object at a short distance.
Figure 20A:
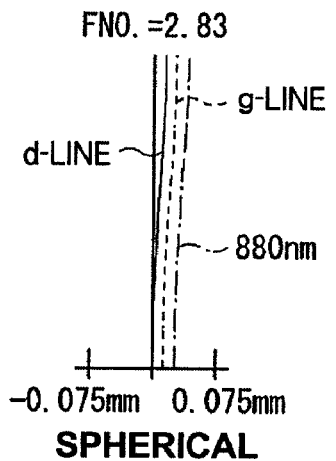
FIG. 20A is a diagram illustrating spherical aberration of an imaging lens of Example 7 when the imaging lens is focused on an object at infinity.
Figure 20B:
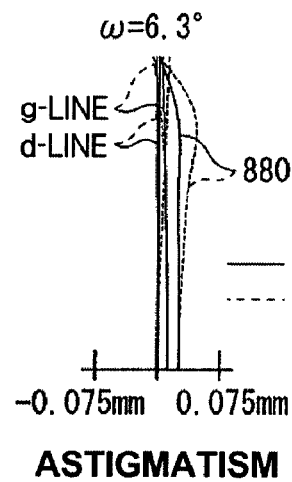
FIG. 20B is a diagram illustrating astigmatism of an imaging lens of Example 7 when the imaging lens is focused on an object at infinity.
Figure 20C:
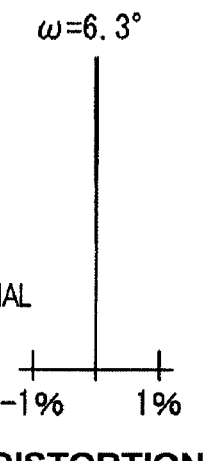
FIG. 20C is a diagram illustrating distortion of an imaging lens of Example 7 when the imaging lens is focused on an object at infinity.
Figure 21A:
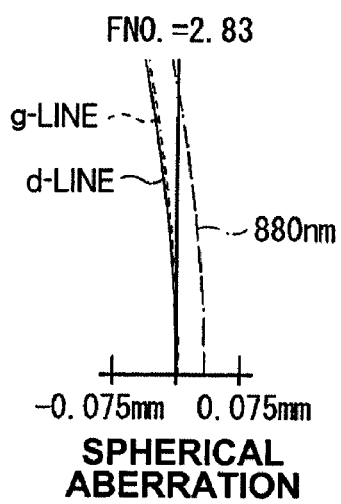
FIG. 21A is a diagram illustrating spherical aberration of an imaging lens of Example 7 when the imaging lens is focused on an object at a short distance.
Figure 21B:
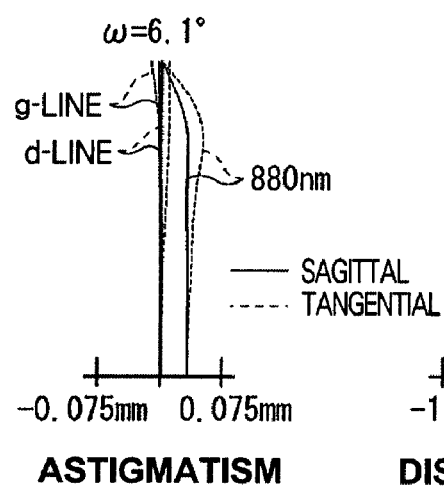
FIG. 21B is a diagram illustrating astigmatism of an imaging lens of Example 7 when the imaging lens is focused on an object at a short distance.
Figure 21C:
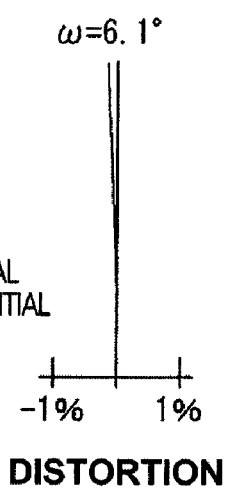
FIG. 21C is a diagram illustrating distortion of an imaging lens of Example 7 when the imaging lens is focused on an object at a short distance.

Similarly, FIGS. 10A through 10C illustrate various aberrations of the imaging lens of Example 2 (when the imaging lens is focused at infinity). Further, FIGS. 11A through 11C illustrate various aberrations of the imaging lens of Example 2 (when the imaging lens is focused on a short distance object). Similarly, various aberrations of the imaging lenses of Examples 3 through 7 are illustrated in FIGS. 12A, 12B, and 12C through FIGS. 21A, 21B and 21C.

As the numerical value data for each example and each of the diagrams illustrating aberrations show, the longitudinal chromatic aberrations and the like are suppressed for a wide wavelength band in each of Examples 1 through 7. Further, it is possible to achieve high-resolution performance, and to realize medium telephoto class imaging lenses in which variation of aberrations depending distances is suppressed.

Further, the present invention is not limited to the aforementioned embodiments and examples, and various modifications are possible. For example, the values of the curvature radius of each lens element, surface interval, refractive index, and the like are not limited to the values specified in the examples, but may be other values.

What is claimed is:

1. An imaging lens comprising:
    a first group having a positive or negative refractive power;
    a second group having a positive refractive power; and
    a third group having a positive or negative refractive power,
        which are sequentially arranged from the object side of the imaging lens,
    wherein the first group includes an aperture stop, and
    wherein the second group includes a positive lens, and a cemented lens composed of a positive lens and a negative lens, and
    wherein the third group is composed of a cemented lens of a positive lens and a negative lens, and
    wherein the following formula (1) is satisfied:

$$0.5 \leq f2/f \leq 1.2 \quad (1),\text{ where}$$

f: focal length of the entire system of the imaging lens, and
    f2: focal length of the second group.

2. An imaging lens, as defined in claim 1, further satisfying the following formula (2):

$$-7.7 \leq f3/f1 \leq 15.0 \quad (2),\text{ where}$$

f1: focal length of the first group, and
    f3: focal length of the third group.

3. An imaging lens, as defined in claim 1, wherein the first group is composed of a plurality of positive lenses, a negative lens, the negative refractive power of an image-side surface of the negative lens being stronger than the negative refractive power of an object-side surface of the negative lens, the aperture stop, and a cemented lens of a double-concave lens and a double-convex lens, which are sequentially arranged from the object side of the imaging lens, and
    wherein when an average value of Abbe numbers of the double-concave lens and the double-convex lens constituting the cemented lens in the first group for d-Line is ν1, the following formula (3) is satisfied:

$$65 \leq \nu 1 \quad (3).$$

4. An imaging lens, as defined in claim 1, wherein when an average value of Abbe numbers of the negative lens in the second group and the negative lens in the third group for d-Line is ν23n, the following formula (4) is satisfied:

$$50 \leq \nu 23n \quad (4).$$

5. An imaging lens, as defined in claim 1, wherein the second group moves, on the optical axis of the imaging lens, toward the object side of the imaging lens to focus the imaging lens on a short distance object.

6. An imaging apparatus comprising:
    an imaging lens as defined in claim 1, and
    an imaging device that outputs an imaging signal corresponding to an optical image formed by the imaging lens.

* * * * *